United States Patent [19]

Watanabe et al.

[11] 3,723,370
[45] Mar. 27, 1973

[54] URETHANATED UNSATURATED POLYESTER RESIN AND PROCESS FOR PRODUCING THE SAME

[75] Inventors: Tadashi Watanabe; Kouichiro Murata; Kiyoshi Nanishi; Akira Yamamoto, all of Kiratsuka, Japan

[73] Assignee: Kansai Paint Company, Limited, Amagasaki-shi, Hyogo-ken, Japan

[22] Filed: Mar. 17, 1971

[21] Appl. No.: 125,391

[52] U.S. Cl............260/22 TN, 117/132 B, 117/148, 117/161 K, 117/161 KP, 260/23 TN, 260/33.2 R, 260/75 NK, 260/77.5 AN
[51] Int. Cl............C08g 22/10, C09d 3/72
[58] Field of Search ......260/22 TN, 75 NK, 77.5 AN

[56] References Cited

UNITED STATES PATENTS

| | | | |
|---|---|---|---|
| 2,970,123 | 1/1961 | Rhodes et al. | 260/22 |
| 2,503,209 | 4/1950 | Nyquist et al. | 260/22 |
| 3,371,056 | 2/1968 | Delius | 260/22 |
| 3,385,345 | 5/1968 | Miraldi | 260/22 |

FOREIGN PATENTS OR APPLICATIONS 947,973  1/1964  Great Britain..........................260/22

Primary Examiner—Donald E. Czaja
Assistant Examiner—Ronald W. Griffin
Attorney—Wenderoth, Lind & Ponack

[57] ABSTRACT

An oil modified unsaturated polyester resin in which at least one hydroxyl group is left at a terminal of its molecule, having a number average molecular weight of from about 1,000 to about 4,000 and acid value of from 5 to 60 is made to react with at least one diisocyanate compound having from 0.2 to 1.2 equivalent of isocyanato group with respect to 1 equivalent of hydroxyl group of said unsaturated polyester resin to produce an urethanated unsaturated polyester resin having a molecular weight of from about 2,000 to about 20,000.

8 Claims, No Drawings

URETHANATED UNSATURATED POLYESTER RESIN AND PROCESS FOR PRODUCING THE SAME

This invention relates to a novel urethanated unsaturated polyester resin and a process for producing the same, said urethanated unsaturated polyester resin being obtained by causing to react an oil modified unsaturated polyester resin in which at least one hydroxyl group is left at a terminal of its molecule with a diisocyanate compound having from 0.2 to 1.2 equivalent of isocyanato group with respect to 1 equivalent of hydroxyl group of the oil modified unsaturated polyester, and thus obtained urethanated unsaturated polyester resin having excellent adhesive property and its cured product being excellent in wear resistance, flexibility, and rubber-like elasticity.

In general, oil modified unsaturated polyester resin is supplied in such a form in which the resin is dissolved into a vinyl monomer and said unsaturated polyester is produced by the condensation polymerization of monobasic acid, unsaturated dibasic acid, its acid anhydride or a mixture consisting of a member selected from these compounds and saturated dibasic acid or its acid anhydride and polyhydricalcohol. In oil modified unsaturated polyester resin, unsaturated double bonds introduced to its resin skeleton from an unsaturated dibasic acid as an acid component are cross-linked with a vinyl monomer to be converted to three-dimensional structure thereby to obtain an insoluble and infusible cured product. Therefore, oil modified unsaturated polyester resin can be employed in solventless form and cold-setting and cold molding thereof are also possible. Furthermore, since oil modified unsaturated polyester resin is easy in its handling and its cured product has a favorable hardness, the resin is widely utilized for manufacturing decorative sheets, coating materials, laminated products, casting products and the like. On the other hand, conventional oil modified unsaturated polyester resin is inferior in its adhesive property and its cured product has disadvantages such as poor wear resistance, poor flexibility, and poor rubber-like elasticity and therefore, the conventional resin is unsuitable for uses such as a coating material for floor in which the above-mentioned properties are particularly required.

It is an object of the present invention to eliminate disadvantages of conventional oil modified unsaturated polyester resin such as poor adhesive property, poor wear resistance, poor flexibility, and poor rubber-like elasticity in its cured product and to provide a novel urethanated unsaturated polyester resin being excellent in the above described properties.

Another object of the present invention is to provide a process for producing the novel urethanated unsaturated polyester resin.

This invention relates to an urethanated unsaturated polyester resin having a number-average molecular weight of about from 2,000 to 20,000 obtained by causing to react a diisocyanate compound with an oil modified unsaturated polyester resin having a number-average molecular weight of from about 1,000 to about 4,000, an acid value of from 5 to 60, preferably from 10 to 50, and at least one hydroxyl group at a terminal of its molecule in a ratio of from 0.2 to 1.2 equivalent of isocyanato group with respect to 1 equivalent of hydroxyl group of said unsaturated polyester resin and also to a process for producing the same. Furthermore, said unsaturated polyester resin is obtained by condensation reaction of 1 mol of dibasic acid and/or its acid anhydride an acid component including from 35 to 90 mol percent of an unsaturated dibasic acid and/or its acid anhydride and from 1.02 to 1.70 mol of dihydric alcohol.

The urethanated unsaturated polyester resin is obtained by reacting the diisocyanate compound with the oil modified unsaturated polyester resin as mentioned above until, when the urethanated unsaturated polyester obtained is dissolved into vinyl monomer so as to 60 percent by weight of the solution, the viscosity of the solution reaches to a value of below Z, preferably below X at a temperature of 25° C in Gardner's bubble viscometer, or until, when the urethanated unsaturated polyester resin obtained is dissolved into cellosolve acetate so as to 60 percent by weight of the solution, the viscosity of the solution reaches to a value of below P, preferably below N measured by the same manner above-mentioned.

The urethanated unsaturated polyester resin according to this invention has excellent adhesive property, the cured product of which has also excellent wear resistance, flexibility, rubber-like elasticity, further, excellent chemical resistance, particularly, alkali resistance and accordingly, the resin of this invention is suitable for a coating material, for example, one for floor of factory.

Furthermore, although a molecular weight of a conventional unsaturated polyester resin is about from 1,500 to 3,000 at the most, the urethanated unsaturated polyester resin according to this invention is one having a higher molecular weight than that of the conventional oil modified unsaturated polyester resin and the resin according to this invention in which molecules of the conventional unsaturated polyester resin are combined by urethan bonds thereby to form the high molecular compound. Accordingly, the physical properties of the urethanated unsaturated polyester resin are further elevated, so that the resin becomes applicable for wide uses and exhibits excellent properties.

That is, in the urethanated unsaturated polyester resin of this invention, excellent properties of polyurethan resin such as excellent flexibility, chemical resistance, rubber-like property, and adhesive property, and excellent physical and chemical properties due to higher polymerization degree of oil modified unsaturated polyester resin are further imparted to favorably various properties of a conventional oil modified unsaturated polyester resin. As a result, the present inventors succeeded in the production of novel urethanated unsaturated polyester having variously excellent properties which could not be attained by any conventional synthetic resin.

The oil modified unsaturated polyester resin employed for this invention is prepared by a common condensation reaction, that is, 1.02 – 1.70 mol of dihydric alcohol is made to react with 1 mol of dibasic acid and/or its acid anhydride and drying oil fatty acid in accordance with a common polycondensation process thereby to obtain the oil modified unsaturated polyester resin having suitable properties such as suitable number average molecular weight, acid value, and amount of terminal hydroxyl group in its molecule. In this case, as the dibasic acid and/or its acid anhydride, a mixture consisting of 35 – 90 mol percent of unsaturated dibasic acid and/or its acid anhydride and 65 – 10 mol percent of saturated dibasic acid and/or its acid anhydride is used.

In the case when a compounding ratio of the unsaturated dibasic acid and/or its acid anhydride is less than 35 mole percent, the resulting oil modified unsaturated polyester resin has relatively small number of cross-linking points, so that merely insufficient cross-linking occurs, curing speed due to the cross-linking becomes slow, and as a result, the resulting oil modified polyester resin is not suitable for practical use. On the other hand, in the case when the ratio of the unsaturated dibasic acid and/or its acid anhydride is more than 90 mol percent, unreacted acid and/or its acid anhydride remain, and the resulting oil modified unsaturated polyester resin becomes cloudy.

Furthermore, in the case when an amount of dihydric alcohol employed for this invention is less than 1.02 mol, it is difficult to obtain a suitable oil modified unsaturated polyester resin having at least one hydroxyl group at a terminal of its molecule. On the other hand, in the case when the amount of the dihydric alcohol is more than 1.70 mol, it becomes difficult to obtain a oil modified polyester resin having a suitable number average molecular weight and being applicable for this invention.

Moreover, in the case when a number average molecular weight of the resulting oil modified unsaturated polyester resin is less than about 1,000, excellent properties of the oil modified unsaturated polyester resin in those of the urethanated unsaturated polyester resin of a final product after curing disappear. On the other hand, in case of the oil modified unsaturated polyester resin having a number average molecular weight of more than about 4,000, it is not only difficult to produce the resin, but also decreases a relative ratio of urethan bonds in its final product, and as a result, its cured product has poor wear resistance, flexibility, and rubber-like elasticity.

As unsaturated dibasic acids or their acid anhydrides employed for preparing the oil modified unsaturated polyester resin in the present invention, there are, for example, maleic acid, maleic anhydride, fumaric acid, mesaconic acid, citraconic acid, and itaconic acid. Furthermore, as the saturated dibasic acids or their acids anhydrides for preparing the oil modified unsaturated polyester resin, there are, for example, phthalic acid, phthalic anhydride, isophthalic acid, 3,6-endomethylenetetrahydrophthalic anhydride, tetrahydrophthalic acid, adipic acid, sebacic acid, and thiodiglycollic acid.

As fatty acids employed for preparing the oil modified unsaturated polyester resin in the present invention, there are drying oil fatty acids, for example, linseed oil fatty acid, soybean oil fatty acid, dehydrated castor oil fatty acid, tung oil fatty acid. An amount of drying oil fatty acids is employed in the range of 3.5 to 20 percent of oil length. In the case of the oil modified unsaturated polyester having oil length of more than 20 percent, it is difficult to produce the clear resin since unreacted fatty acid is still existent in reaction mixture. On the other hand, in the case of the oil modified unsaturated polyester having oil length of less than 3.5 percent, it is difficult to obtain the resin having excellent air drying property and excellent flexibility after curing. The drying oil fatty acid is charged into reaction mixture when an amount of condensed water from dibasic acid and/or its anhydride and dihydric alcohol in preparing the unsaturated polyester resin reaches in the range of 65 to 85 percent by volume of a theoretical volume calculated (This volume is contained the condensed water from the drying oil fatty acid.). If the drying oil fatty acid is charged in initial step of the reaction, it is difficult to obtain the oil modified unsaturated polyester resin having desirable molecular weight, viscosity and acid value for gelation.

As an alcohol component employed for preparing the oil modified unsaturated polyester resin in this invention, there are dihydric alcohols. If alcohols with three or more hydroxyl groups are employed by mixing with dihydric alcohol, there is a risk of gelation in urethanating reaction of the succeeding reaction step and this is, therefore, unfavorable. The dihydric alcohol is employed in a ratio of 1.02 – 1.70 mol with respect to 1 mol of dibasic acid and/or its acid anhydride. In this case, if the ratio of the dihydric alcohol is less than 1.02 mol, it is impossible to prepare the oil modified unsaturated polyester resin having at least one hydroxyl group at a terminal of its molecule. Conversely, in the case when the ratio of dihydric alcohol is more than 1.70 mol, it is hard to obtain the unsaturated polyester resin having a suitable number average molecular weight.

For the dihydric alcohols employed in the present invention, there are, for example, ethylene glycol, diethylene glycol, 1,2-propylene glycol, dipropylene glycol, 1,3-butylene glycol, 2,3-butylene glycol, hydrogenated bisphenol A, bisphenoldioxyethyl ether, bisphenoldioxypropyl ether, neopentyl glycol, 1,4-butenediol, and 1,6-hexanediol.

An inhibitor is employed to inhibit gelation for preparing the oil modified unsaturated polyester resin in this invention. There are, for example, hydroquinone, p-benzoquinone and catechol. The inhibitor is employed in the range of 60 to 1,000 ppm to resin.

In the present invention, the oil modified unsaturated polyester resin, as mentioned above, produced by a common polycondensation reaction is generally dissolved into a vinyl monomer or a mixture of vinyl monomers and is used for the succeeding urethanated reaction.

It is desirable to obtain an unsaturated polyester resin by which reacts dihydric alcohol with dibasic acid until, when the unsaturated polyester resin is dissolved into cellosolve acetate so as to 60 percent by weight of the solution, the viscosity of the solution reaches to below N, preferably K at a temperature of 25° C in Gardner's bubble viscometer.

As the vinyl monomers for dissolving the oil modified unsaturated polyester resin as mentioned above, there are, for example, styrene, vinyltoluene, divinylbenzene, diallyl phthalate, vinyl acetate, methyl methacrylate, diallyl ether, divinyl ether, ethyl acrylate, and butyl acrylate, and these vinyl monomers may be independently or jointly used.

Then, in the oil modified unsaturated polyester resin having at least one hydroxyl group at a terminal of its molecule and prepared as mentioned above, urethanating reaction is carried out with a diisocyanate compound in a ratio of 0.2 – 1.2 equivalent of isocyanate group with respect to 1 equivalent of hydroxyl group of the oil modified unsaturated polyester resin. In this case, when the isocyanato group is less than 0.2 equivalent, the effects or advantages of the urethanating reaction in a cured product of the resulting final product are not remarkable and, conversely, in the case when the isocyanato group is more than 1.2 equivalent, excellent effects or advantages as in the present invention cannot be obtained, because unreacted diisocyanate compound remains in the final product.

The urethanating reaction of this invention can be completed by merely such a manner that diisocyanate compound is added to the oil modified unsaturated polyester resin prepared as mentioned above or its vinyl monomer solution and the resulting mixture is heated for a certain period while stirring it. The heating temperature and reaction period may be determined in accordance with required properties of the resin, that is, degree of the urethanation.

The reaction temperature is generally selected within a range of from 40° to 120° C, preferably from 50° to 80° C, but urethanating reaction proceeds also in a room temperature.

Furthermore, although the reaction period differs in connection with the heating temperature and a required degree of the urethanation (high polymerization), the reaction is carried out in general within a period of a range of from 20 min. to 5 hrs.

The urethanating reaction as mentioned above may be carried out by adding directly diisocyanate compound to the oil modified unsaturated polyester resin, but since a viscosity of the resin is comparatively high, particularly in the case of the reaction at a low temperature and the viscosity of which becomes higher in accordance with the proceeding of the urethanating reaction, there is a fear of occuring an uneven urethanating reaction. Accordingly, it is desirable that the oil modified unsaturated polyester resin is preliminarily dissolved into a vinyl monomer, which is inactive with respect to diisocyanate compound, to adjust the viscosity of the resulting mixture to a suitable value, and then, the mixture is made to react with each other.

In a reaction of a form of a vinyl monomer solution, since there is a case in which the vinyl monomer and the oil modified unsaturated polyester resin polymerize with each other to occur gelation by causing to react them for a long period at a high temperature, it is desirable to add a polymerization-inhibitor such as p-benzoquinone being non-reactive with diisocyanate compound to the vinyl monomer solution and then, to carry out urethanating reaction in the case when the reaction temperature is more than 100° C.

The urethanated unsaturated polyester resin is obtained by reacting the diisocyanate compound with the oil modified unsaturated polyester resin as mentioned above until, when the urethanated unsaturated polyester obtained is dissolved into vinyl monomer so as to 60 percent by weight of the solution, the viscosity of the solution reaches to a value of below Z, preferably below X at a temperature of 25° in Gardner's bubble viscometer, or until, when the urethanated unsaturated polyester resin obtained is dissolved into cellosolve acetate so as to 60 percent by weight of the solution, the viscosity of the solution reaches to a value of below P, preferably below N measured by the same manner above-mentioned. In the case when the viscosity exceeds a value of Z or P, the reaction system gels becomes too high viscosity.

Since the urethanating reaction gradually proceeds even at a room temperature, the reaction must be stopped by adding a terminating agent to the reaction system immediately after the completion of the urethanating reaction.

For the terminating agents, monohydric alcoholic compounds are effective and there are, for example, alcohols such as methanol, ethanol, isopropanol, and butanol, further, other alcohols having polymerizable unsaturated groups such as β-hydroxypropyl methacrylate, allyl β-hydroxyethyl acrylate, β-hydroxypropyl methacrylate, allyl alcohol, and methallyl alcohol, and particularly, alcohols having polymerizable unsaturated groups are suitable. A quantity to be added of the alcohols varies in accordance with degree of urethanation, but normally, equimolar or above of alcohol with respect to a quantity of a diisocyanate compound previously added to the unsaturated polyester resin is desirable.

In the present invention, for the modification of the oil modified unsaturated polyester resin, diisocyanate compound is employed. In the case when monoisocyanate compound is employed for the modification, an urethanated unsaturated polyester resin of a high molecular weight cannot be obtained and whereas, in the case when isocyanate compounds with three or more isocyanato group are employed, gelation occurs in a modification reaction and as a result, the objects of the present invention cannot be attained.

For the diisocyanate compounds employed for the present invention, there are, for example, 2,4-tolylenediisocyanate, 2,6-tolylenediisocyanate, 1,6-hexamethylenediisocyanate, 4,4'-diphenylmethanediisocyanate, 4,4'-diphenyletherdiisocyanate, m-phenylenediisocyanate, 1,5-naphthalenediisocyanate, biphenylenediisocyanate, 3,3'-dimethyl-4,4'-biphenylenediisocyanate, dicyclohexylmethane-4,4'-diisocyanate, p-xylylenediisocyanate, m-xylylenediisocyanate, bis (4-isocyanatophenyl) sulfone, and isopropylidenebis (4-phenylisocyanate) and these compounds may be independently or jointly employed.

The urethanated unsaturated polyester resin thus obtained according to this invention can perfectly attain the objects of the present invention and the resulting resin has excellent characteristic features.

In order to indicate still more clearly the nature and utility of the invention, the following specific examples of practice constituting preferred embodiments of the invention and results are set forth it being understood that these examples are presented as illustrative only, and that they are not intended to limit the scope of the invention.

In the following examples each part or percent is indicated by weight, respectively.

EXAMPLE 1.

7 mols of maleic anhydride, 3 mols of phthalic anhydride, 3 mols of diethylene glycol, and 7.5 mols of ethylene glycol were heated and reacted in nitrogen gas atmosphere at a temperature of 200° C in accordance with a conventional process, and 0.5 mol of linseed oil fatty acid and 300 ppm of hydroquinone was added at 200° C when an amount of condensed water reached to 75 percent of a theoretical volume calculated. Reaction mixture was further subjected to condensation until a viscosity of the resulting condensation product reached to a value of J (measured in the form of a cellosolve acetate solution containing 60 percent of resin at a temperature of 25° C, and this being same as in the following corresponding part) in Gardner's bubble viscometer thereby to prepare a resin. Thus prepared resin was diluted with styrene to a solution having a resin content of 75 percent and the acid value of the resin being a value of 19 percent.

To 134 part of 75 percent styrene solution, 5 parts of 2,4- / 2,6-tolylenediisocyanate (a mixture in a ratio of 80/20 by weight) was added (The viscosity of the resulting admixture in 50 percent cellosolve acetate solution being a value of C at a temperature of 25° C in Gardner's bubble viscometer.) and the resulting admixture was made to react for 3 hrs. at a temperature of 50° C while sufficiently stirring it. Then, 5 parts of β-hydroxyethyl methacrylate was added to the resulting product to complete the reaction. The viscosity of thus obtained reaction product became higher (The viscosity of which in 50 percent cellosolve acetate solution being a value of J - K at a temperature of 25° in Gardner's bubble viscometer.) than that prior to the reaction. This reaction product was further diluted with a mixture consisting of 24 parts of styrene and 15 parts of β-hydroxyethyl methacrylate whereby a resin content of the resulting admixture was adjusted to 60 percent. The viscosity of which was a value of V at a temperature of 25° C in Gardner's bubble viscometer.

EXAMPLE 2

5 mols of fumaric acid, 3 mols of tetrahydrophthalic anhydride, 2 mols of adipic acid, and 11 mols of propylene glycol were heated and reacted in nitrogen gas atmosphere at a temperature of 200° C in accordance with conventional process and 1.0 mol of soybean oil fatty acid and 500 ppm of p-benzoquinone was added at 200° C when an amount of condensed water reached to 83 percent of a theoretical volume, and were further subjected to condensation until a viscosity of the resulting condensation product reached to a value of H measured by Gardner's bubble viscometer thereby to prepare a resin. Thus prepared resin was diluted with stylene to a solution having a resin content of 80 percent and the acid value of the resin being 30.

To 125 parts of 80 percent styrene solution, 10 parts of 1,6-hexamethylenediisocyanate was added (The viscosity of the resulting mixture in 50 percent cellosolve acetate solution being a value of B at a temperature of 25° C in Gardner's bubble viscometer.) and the resulting admixture was made to react for 30 min. at a temperature of 80° C while sufficiently stirring it. Then 20 parts of β-hydroxypropyl methacrylate was added to the resulting product to complete the reaction. The viscosity of thus obtained reaction product became higher (The viscosity of which in 50 percent cellosolve acetate solution being a value of M at a temperature of 25° C in Gardner's bubble viscometer.) than that prior to the reaction. This reaction product was further diluted with 35 parts of stylene whereby a resin content of the resulting mixture was adjusted to 60 percent. The viscosity of which was a value of X at a temperature of 25° C in Gardner's bubble viscometer.

EXAMPLE 3

3.5 mols of maleic anhydride, 2.5 mols of isophthalic acid, 2 mols of 3,6-endomethylenetetrahydrophthalic anhydride, 2 mols of adipic acid, 4 mols of neopentyl glycol, 4 mols of ethylene glycol, and 4 mols of 1,3-butylene glycol were heated and reacted in nitrogen gas atmosphere at a temperature of 200° C in accordance with conventional process, and 1.5 mols of dehydrated castor oil fatty acid and 800 ppm of catecol was added at 200° C when an amount of condensed water reached to 67 percent of theoretical volume. And were further subjected to condensation until a viscosity of the resulting condensation product reached to a value of I measured by Gardner's bubble viscometer thereby to prepare a resin. Thus prepared resin was diluted with styrene to a solution having a resin content of 50 percent and the acid value of the resin being 25.

To 200 parts of 50 percent styrene solution, 20 parts of para / meta-xylylenediisocyanate (a mixture in a ratio of 25/75 by weight) was added (The viscosity of the resulting mixture being a value of C at a temperature of 25° C in Gardner's bubble viscometer.) and the resulting admixture was made to react for 30 min. at a temperature of 60° C while sufficiently stirring it. Then, a mixture consisting of 5 parts of butanol and 20 parts of β-hydroxyethyl acrylate was added to the resulting product to complete the reaction. The viscosity of thus obtained reaction product became higher (The viscosity of which being a value of W at a temperature of 25° C in Gardner's bubble viscometer.) than that prior to the reaction.

EXAMPLE 4

Results of tests relating to water resisting property and alkali resistance of the urethanated unsaturated polyester resins produced in Examples 1 - 3 were shown in the following Table 1 and those relating to adhesive property and flexibility were shown in the following Table 2. Furthermore, for the comparison, the results of tests as to the unsaturated polyester resin solutions prepared in Examples 1 - 3 and being not urethanated, respectively, were shown in the both Tables.

A curing condition in Table 1 was such that to each sample resin solution, 1.0 percent of methylethylketone peroxide (50 percent solution of dimethyl phthalate), 1.0 percent of cobalt naphthenate (toluene solution and its metal content being 12 percent), and 2 percent of a solid paraffin (having a melting point of 62° C) of 5 percent styrene solution were added to obtain a mixture, thus obtained mixture was applied on a particle board having a thickness of 4 mm in such a manner that the applied film thickness being 300 microns, and was dried at a temperature of 25° C for 24 hrs. The resulting each test piece was immersed into warmed water and 3 percent aqueous sodium hydroxide solution, respectively.

The compounding ratio as to each sample resin solution in Table 2 was the same as in Table 1, the resulting mixture was applied on a mild steel test panel having a thickness of 0.5 mm in such a manner that the applied film thickness being 30 microns, and was dried at a temperature of 25° C for 24 hrs. With respect to thus obtained each test piece, square test, bending test, and Erichsen test were carried out, respectively.

TABLE 1.—TESTS OF WATER RESISTING PROPERTY AND ALKALI RESISTANCE

| Ex. | Sample | Water resisting property [1] (applied film) | Alkali resistance [2] (3% aqueous sodium hydroxide solution) (applied film) |
|---|---|---|---|
| 1 | Urethane modifying | No change | No change. |
| 1 | Without modifying | Whole surface peeling | Partly peeling. |
| 2 | Urethane modifying | No change | No change. |
| 2 | Without modifying | Whole surface peeling | Partly peeling, blistering. |
| 3 | Urethane modifying | No change | No change. |
| 3 | Without modifying | Whole surface peeling | Whole surface peeling. |

[1] After immersion in warmed water of a temperature of 70° C. for 1 hr., a drying operation at a temperature of 60° C. for 2 hrs. was repeated twice.
[2] Immersion at a temperature of 25° C. for 3 days.

TABLE 2.—TESTS OF ADHESIVE PROPERTY AND FLEXIBILITY

| Ex. | Sample | Square test [1] | Bending test [2] | Erichsen test,[3] mm. |
|---|---|---|---|---|
| 1 | Urethane modifying | 25/25 | Pass 2 mm. with no crock. | 7 |
| 1 | Without modifying | 0/25 | No pass 10 mm. with crock. | 0.5 |
| 2 | Urethane modifying | 25/25 | Pass 2 mm. with no crock. | 7 |
| 2 | Without modifying | 0/25 | Pass 8 mm. with no crock. | 2 |
| 3 | Urethane modifying | 25/25 | Pass 2 mm. with no crock. | 7 |
| 3 | Without modifying | 0/25 | Pass 10 mm. with no crock. | 1 |

[1] 25 squares of each 5 mm.[2] were made on each sample resin applied surface on a mild steel plate in such a manner that their cut marks reached to the steel plate, an Scotch tape was bonded to the whole surface of the squares, a uniform force was applied on the surface, and then, the tape was quickly stripped off. Succeedingly, a number of squares left on the steel plate was counted and indicated as follows: Estimation=S/100, S: Number of squares left on plate. In this square test, an applied plate was left in an air-conditioned room of a temperature of 20±1° C. and a relative humidity of 75±3% for 1 hr. and then, the test was carried out in the same room.
(Furthermore, bending test and Erichsen test were also carried out in the same condition and same room as mentioned above, respectively.)
[2] Mandrel bending test.
[3] Measured by Erichsen film tester. In this case, a value when an applied film was broken was indicated by a unit of mm.

What is claimed is:

1. A urethanated unsaturated polyester resin which is prepared by the following steps:

A. reacting from 1.02 to 1.70 mol of dihydric alcohol as an alcohol component with 1.0 mol of a mixture as an acid component consisting of 35 to 90 mol percent of unsaturated dibasic acid and/or its anhydride and 65 to 10 mol percent of saturated dibasic acid and/or its acid anhydride and being modified with a drying oil fatty acid to produce an oil-modified unsaturated polyester resin having the following characteristics:
  a. A number average molecular weight of from about 1,000 to 4,000,
  b. At least one hydroxyl group at a terminal of its molecule,
  c. The amount of drying oil fatty acid being sufficient to produce an oil length of 3.5 to 20 percent,
  d. An acid value of from 5 to 60, and
  e. Viscosity being a value of below N at a temperature of 25° in Gardner's bubble viscometer when said polyester resin is dissolved into cellosolve acetate so as to obtain a 60 percent by weight solution; and then B. reacting 1 equivalent of hydroxyl group of said oil-modified unsaturated polyester resin with 0.2 to 1.2 equivalents of the isocyanate group of a diisocyanate compound to produce the urethanated unsaturated polyester resin having the following characteristics:
  a. A number average molecular weight of from about 2,000 to about 20,000 and
  b. Viscosity being a value of below Z at a temperature of 25° C in Gardner's bubble viscometer when said urethanated unsaturated polyester resin is dissolved into vinyl monomer so as to make a 60 percent by weight solution, or viscosity being a value of below P at a temperature of 25° C in Gardner's bubble viscometer when said urethanated unsaturated polyester resin is dissolved into cellosolve acetate so as to make a 60 percent by weight solution.

2. A product according to claim 1, in which said drying oil fatty acid is one or more members selected from the group consisting of linseed oil fatty acid, soybean oil fatty acid, dehydrated castor oil fatty acid and tung oil fatty acid, said drying oil fatty acid being charged after the amount of condensed water discharged from the reaction of the alcohol and acid components reaches 65 to 85 percent by volume of the theoretical volume.

3. A product according to claim 1, in which said oil modified unsaturated polyester resin is dissolved in a vinyl monomer or mixture thereof selected from the group consisting of styrene, vinyltoluene, divinylbenzene, diallyl phthalate, vinyl acetate, methyl methacrylate, diallyl ether, divinyl ether, ethyl acrylate and butyl acrylate.

4. A product according to claim 1, in which a terminating agent is added to the resulting urethanated unsaturated polyester resin immediately after the completion of said reaction, said terminating agent being a monohydric compound or mixture therefore selected from the group consisting of methanol, ethanol, propanol, butanol, β-hydroxyethyl methacrylate, β-hydroxyethyl acrylate, β-hydroxypropyl methacrylate, allyl alcohol and methallyl alcohol.

5. A product according to claim 1, in which said diisocyanate compound is selected from the group consisting of 2,4-tolylenediisocyanate, 2.6-tolylenediisocyanate, 1,6-hexamethylenediisocyanate, 4,4'-diphenylmethanediisocyanate, 4,4'-diphenyletherdiisocyanate, m-phenylenediisocyanate, 1,5-naphthalenediisocyanate, biphenylenediisocyanate, 3,3'-dimethyl -4,4'-biphenylenediisocyanate, dicyclohexylmethane-4,4'-diisocyanate, p-xylylenediisocyanate, m-xylylenediisocyanate, bis (4-isocyanatophenyl) sulfone, and isopropylidenebis (4-phenylisocyanate).

6. A product according to claim 1, in which said dihydric alcohol is selected from the group consisting of ethylene glycol, diethylene glycol, 1,2-propylene glycol, dipropylene glycol, 1,3-butylene glycol, 2,3-butylene glycol, hydrogenated bisphenol A, bisphenoldioxyethyl ether, bisphenoldioxypropyl ether, neopentyl glycol, 1,4-butenediol, and 1,6-hexanediol.

7. A product according to claim 1, in which said unsaturated dibasic acid and/or its acid anhydride is selected from the group consisting of maleic acid, maleic anhydride, fumaric acid, mesaconic acid, citraconic acid, and itaconic acid.

8. A product according to claim 1, in which said saturated dibasic acid and/or its acid anhydride is selected from the group consisting of phthalic acid, phthalic anhydride, isophthalic acid, 3,6-endomethylenetetrahydrophthalic anhydride, tetrahydrophthalic acid, adipic acid, sebacic acid, and thiodiglycollic acid.

* * * * *